June 24, 1930.   H. L. HENRY   1,766,514
LAWN SPRINKLER
Filed Aug. 24, 1925
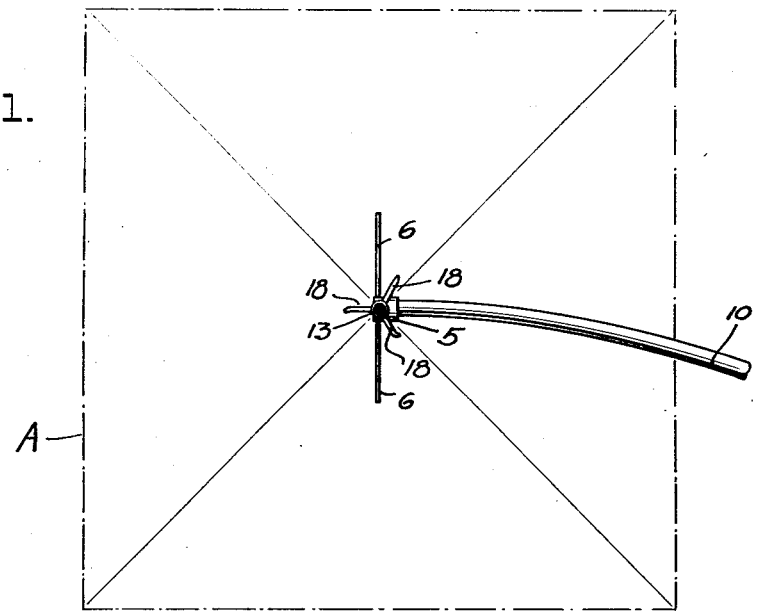
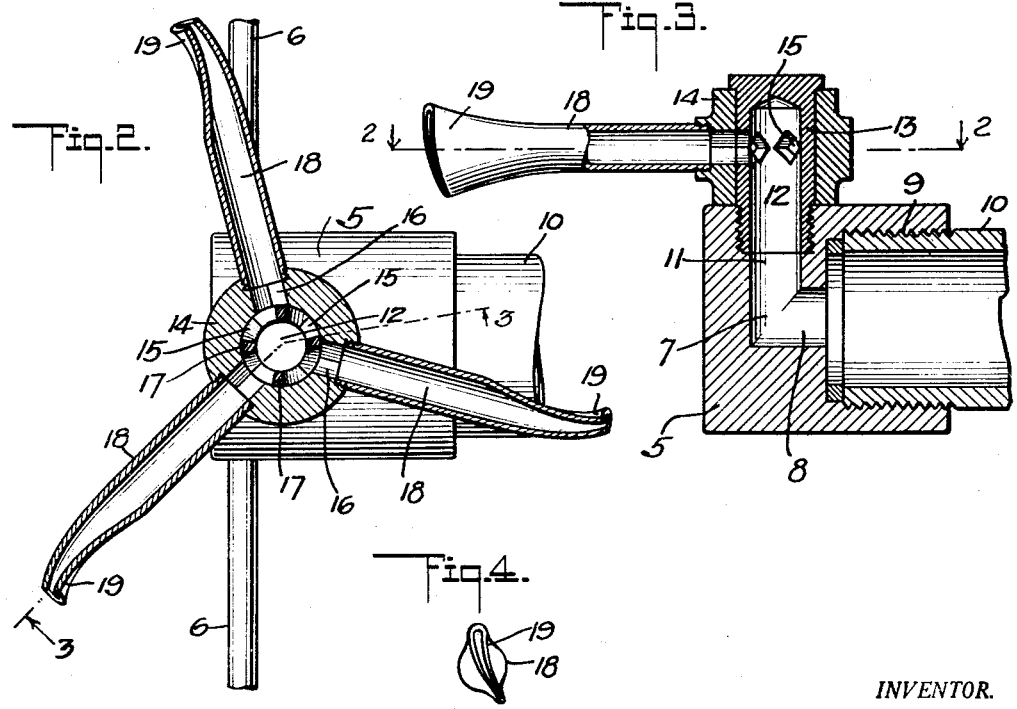
INVENTOR.
HENRY L. HENRY
BY Munn & Co.
ATTORNEYS.

Patented June 24, 1930

1,766,514

UNITED STATES PATENT OFFICE

HENRY L. HENRY, OF BURBANK, CALIFORNIA, ASSIGNOR OF ONE-HALF TO JOSEPH R. PRETER, OF LOS ANGELES, CALIFORNIA

LAWN SPRINKLER

Application filed August 24, 1925. Serial No. 52,244.

This invention relates to lawn sprinklers and has for its object the provision of new and novel means of this character embodying mechanism whereby, when the device is arranged at the approximate center of an imaginary, squared, sub-divided part of a lawn or other surface, the volume of water will be automatically controlled, and its operation will be gaged so that the corners of the said square will be reached by the spray, and that the lawn or surface under treatment will be uniformly sprinkled, all commensurate and in time with an operation that will diminish the volume of water as it issues from the device and as its mechanism functions at all intermediate points of the square, in order to graduate the water volume so that the stream of water is shorter at all points between the corners of the square than at the immediate corners thereof.

Other objects and advantages will become apparent from a careful consideration of the following description in connection with the accompanying drawings, in which Figure 1 is a plan view of the device showing it positioned at the center of a square so as to describe an orbital path around the vertical axis thereof;

Figure 2 is a sectional plan of the device on an enlarged scale, the view being taken in a plane indicated by the line 2—2 in Figure 3;

Figure 3 is a vertical section taken through the device in a plane indicated by the lines 3—3 in Figure 2; and Figure 4 is a front end view of one of the impeller arms.

In practice, use is made of a supporting stand 5 adapted to rest on the ground or some suitable support, and in order to stabilize the stand I provide it with lateral arms 6—6, which rest in firm contact with the ground. This stand is provided with a portway 7 whose branch 8 opens toward the interior thread 9 of the stand so that it thereby will be in open communication with the hose or water supply connection 10. A vertical branch 11 of the portway 7 opens to the chamber 12 of a member 13, the latter serving as an axis around which an impeller or spray head 14, snugly fitting the member, is adapted to rotate in a horizontal plane.

The member 13 is provided with an annular series of discharge openings 15, which preferably are equidistantly arranged in a plane at right angles to the axis of the member, four such openings being employed in this instance. Each of these openings is of a square design and has two of its corners in horizontal alinement and its other two corners in vertical alinement.

The impeller or spray head 14 is formed with an annular series of openings 16, which preferably are equidistantly arranged in the same plane as the openings 15, so that the openings 15 will be traversed by the openings 16 when the head revolves. Three of the openings 16 are preferably provided, as shown, against four of the openings 15. Thus, because they are equidistantly spaced around the head, the parting walls 17 between the openings 15 serve as partial shutters or flow-determining means which graduate the discharge of water from said openings 16, as the head describes an orbital path around its axis. The openings 15, while square, are slightly flared outwardly, as clearly shown in Figure 2.

Fitting in the openings 16 are spray nozzles 18 whose outer ends are flattened somewhat and are helically twisted at 19, the latter representing their discharge ends.

With reference to Figure 1, in which the stand 5 is shown as placed at the center of an imaginary square A, and with reference to Figure 2, in which the stand is in the same position as in Figure 1, it will be observed that the openings 15 respectively face toward the four corners of the square. With reference to Figures 2 and 3, it is observed that one of the openings 15 is in full registration with one of the openings 16 so that, in consequence thereof, these openings will allow a greater volume of water to pass therethrough than would be possible were these respective openings not in full alinement. As a result thereof, a stream of water equal in length to the distance between the axial center of the spray head to one extreme corner of the square will discharge from the mating nozzle of the head. As the openings leave these relative positions of alinement, the discharge of the water is diminished or graduated so as to produce intermediate streams or sprays of relatively graduated lengths until the next corner is reached, when the stream will be increased to its maximum length. In this manner, I am able to open the spray head to the source of water supply so that, as the head constantly revolves, the length of the spray is constantly changing in order to insure longer streams of water at the corners of a square than at any other portions describing the boundary thereof.

Although I have herein shown and described only one form of lawn sprinkler embodying my invention, it is to be understood that various changes and modifications may be made therein without departing from the spirit of the invention and the spirit and scope of the appended claims.

I claim as my invention:

1. A sprinkler comprising snugly fitting, mating and apertured instrumentalities adapted to be arranged on a vertical axis in a water-supply source of constant pressure, one of the instrumentalities being rotatable around said axis, and means for continuously and automatically determining and constantly changing the length of a stream of water from the sprinkler, so that an area bordered by straight lines can be sprinkled.

2. A lawn sprinkler comprising a mounting having a water inlet and an annular series of discharge openings, and an impeller in contact with, and rotatable on, the mounting and having an annular series of discharge openings adapted during the rotation of the impeller to register with, and to pass across, the openings of the mounting, the series of openings of the impeller and the mounting being so disposed to each other that each of the openings in the impeller will at all times overlap at least a portion of one of the openings of the mounting, and that thus, during the rotation of the impeller, streams of water will be continuously discharged from its openings in constantly varying volumes, ranging from a predetermined minimum to a predetermined maximum and then vice versa, in order to cause the uniform sprinkling of an area bordered by straight lines.

3. A lawn sprinkler comprising a mounting having an inlet adapted to be connected with a source of water supply under uniform pressure and provided with an annular series of substantially square discharge openings diagonally disposed with respect to the plane of rotation of an impeller on the mounting, and an impeller in contact with, and rotatable on, the mounting and having an annular series of discharge openings diagonally disposed to the plane of rotation of the impeller and adapted during the rotation of the impeller to register with, and to pass across, the openings of the mounting, the series of openings of the mounting and the impeller being so related to each other that each of the openings in the impeller will at all times overlap at least a portion of one of the openings in the mounting, and that thus, during the rotation of the impeller, streams of water will be continuously discharged from its openings in constantly varying volumes in order to cause the trajectory of the streams thereby to vary from a predetermined minimum to a predetermined maximum and then vice versa and thereby effect the uniform sprinkling of an area bordered by straight lines.

HENRY L. HENRY.